United States Patent [19]

Loth et al.

[11] Patent Number: 5,004,769

[45] Date of Patent: Apr. 2, 1991

[54] USE OF NONIONIC CELLULOSE ETHERS IN JOINT-SEALING MATERIALS AND COATING MATERIALS

[75] Inventors: Helmut Loth, Essen; Klaus Helpenstein, Moenchengladbach; Tore Podola, Monheim; Bernhard Knop, Monheim-Blee, all of Fed. Rep. of Germany

[73] Assignee: Henkel Kommanditgesellschaft auf Aktien, Duesseldorf-Holthausen, Fed. Rep. of Germany

[21] Appl. No.: 342,408

[22] Filed: Apr. 24, 1989

[30] Foreign Application Priority Data

Apr. 26, 1988 [DE] Fed. Rep. of Germany ....... 3814078

[51] Int. Cl.$^5$ .......................... C08L 33/08; C08L 1/26; C09D 3/81; C09K 3/10
[52] U.S. Cl. .......................................... 524/43; 524/44
[58] Field of Search ..................................... 524/43, 44

[56] References Cited

U.S. PATENT DOCUMENTS 3,859,233  1/1975  Barker .................................. 524/43
4,454,267  6/1984  Williams ............................... 524/43

OTHER PUBLICATIONS

Rothenberger, L., Lombardo, J. A., and Jordan, A. D.; Resin Review, vol. 35, No. 2, (Circa 1985), pp. 11–18.

*Primary Examiner*—Nathan M. Nutter
*Attorney, Agent, or Firm*—Ernest G. Szoke; Wayne C. Jaeschke; Real J. Grandmaison

[57] ABSTRACT

Joint-sealing materials and coating materials which contain aqueous dispersions of polyacrylates or acrylate copolymers, plasticizers and the usual additives, such as pigments and the like, have excellent properties particularly with regard to brushability, smoothing behavior and wash-out resistance when they contain a nonionic cellulose ether selected from the group consisting of hydroxyethyl cellulose, hydroxyethyl-methyl cellulose, hydroxypropyl-methyl cellulose and hydroxypropyl cellulose having a Brookfield viscosity in a 2% aqueous solution at 20° C. of at least 3000 mPa.s.

18 Claims, 1 Drawing Sheet

USE OF NONIONIC CELLULOSE ETHERS IN JOINT-SEALING MATERIALS AND COATING MATERIALS

BACKGROUND OF THE INVENTION

1. Field of the Invention

The invention relates to the use of nonionic cellulose ethers selected from the group consisting of hydroxyethyl cellulose, hydroxyethyl-methyl cellulose, hydroxypropyl-methyl cellulose and hydroxypropyl cellulose having a Brookfield viscosity in a 2% aqueous solution at 20° C. of at least 3000 mPa.s and preferably at least 5000 mPa.s, as additives for joint-sealing materials and coating materials which are based on aqueous dispersions of polyacrylates or acrylate copolymers to improve the brushability and the smoothing behavior of not yet hardened surfaces of these materials.

2. Discussion of Related Art

It is known from Ullmann, Enzyklopaedie der technischen Chemie, 4th. Edition, pp. 208–209 that nonionic cellulose ether derivatives such as hydroxyethyl cellulose (HEC), hydroxyethyl-methyl cellulose (HEMC) and hydroxypropyl-methyl cellulose (HPMC) may be added to synthetic resin plasters to improve their water-retention capacity, workable period, wet-adhesion and thickening and setting behavior. German patent 36 19 142 discloses the further use of water-soluble cellulose derivatives as auxiliary agents in the mechanical smoothing of unhardened surfaces of pasty materials, particularly joint-sealing materials, e.g., those based on polyacrylates.

The generally known formulations of joint-sealing materials and coating materials, after application, are normally smoothened out with smoothing water or water/wetting agent mixtures, e.g. as in German patent 36 19 142. The use of smoothing agents makes it possible to form both technically and optically faultless connections with bordering structures and to even out imperfections in the surfaces of these materials. The accumulation of the wetting agents contained in the smoothing agent causes reduction of the slip-resistance on the surface of the jointing agent and makes slippage itself a possibility. Under certain preconditions the accumulation of wetting agents results in the emulsification of formulation constituents on the surface of the materials. Because this alters the composition of the material at its surface, the technical properties of the jointing agent can be impaired. The depletion of constituents of the material at its surface can equally be disadvantageous.

DESCRIPTION OF THE INVENTION

Other than in the operating examples, or where otherwise indicated, all numbers expressing quantities of ingredients or reaction conditions used herein are to be understood as modified in all instances by the term "about".

The invention relates to joint-sealing materials and coating materials which, besides having excellent properties such as their modulus of elasticity, breaking strain and resetting ability, have an improved overall smoothing behavior and at the same time a considerably improved resistance to migration or wash-out of the formulation constituents at the surface of the material compared with known formulations. This is achieved by the use of nonionic cellulose ethers selected from the group consisting of hydroxyethyl cellulose hydroxyethyl-methyl cellulose, hydroxypropyl-methyl cellulose and hydroxypropyl cellulose having a Brookfield viscosity in a 2% aqueous solution at 20° C. of at least 3000 mPa.s, and preferably at least 5000 mPa.s, as additives for joint-sealing materials and coating materials based on aqueous dispersions of polyacrylates or acrylate copolymers to improve the brushability and the smoothing behavior of the not yet hardened surfaces of these materials.

A significant and unexpected advantage of the joint-sealing materials and coating materials of the invention is furthermore obtained in their so-called "wash-out" behavior, i.e. when the material has been applied but is not yet dry, it remains resistant for a longer period of time to the action of water, e.g., rain water.

The invention also relates to joint-sealing materials or coating materials comprising (a) an aqueous dispersion of polyacrylates or acrylate copolymers, (b) a nonionic cellulose ether selected from the group consisting of hydroxyethyl cellulose, hydroxypropyl-methyl cellulose, hydroxypropyl-methyl cellulose and hydroxypropyl cellulose having a Brookfield viscosity in a 2% aqueous solution at 20° C. of at least 3000 mPa.s, and preferably at least 5000 mPa.s, and optionally (c) the usual additives, e.g. pigments, wetting agents, plasticizers (extenders), defoamers, dispersion aids, preservatives and anti-aging agents.

According to a preferred embodiment of the invention, the nonionic cellulose ethers selected from the group consisting of hydroxyethyl cellulose, hydroxyethyl-methyl cellulose, hydroxypropyl-methyl cellulose and hydroxypropyl cellulose having a Brookfield viscosity in a 2% aqueous solution at 20° C. of at least 3000 mPa.s, and preferably at least 5000 mPa.s, are present in an amount of 0.4 to 6.0% by weight, preferably 0.6 to 5.0% by weight, based on the solids content of the dispersion.

The aqueous dispersions of polyacrylates or acrylate copolymers present in the joint-sealing and coating materials of the invention preferably have a solids content of 40 to 70% by weight, and more preferably 45 to 65% by weight. Their pH value should be at least 7, and preferably 8 to 9, and if necessary is adjusted to these values.

Fillers may also be present in the joint-sealing and coating materials of the invention in an amount of 0 to 60% by weight, especially 2 to 60% by weight, based on the total weight of the joint-sealing materials or coating materials. These materials have a high transparency if they contain only very little or no fillers.

According to a further advantageous embodiment of the invention, the joint-sealing materials and coating materials contain chlorinated hydrocarbons, particularly chlorinated paraffins as plasticizers and nonionic surfactants as wetting agents. Commercial chlorinated paraffins are preferred which have a chain length of about 10 to 18 carbon atoms and a chlorine content of about 40 to 70% by weight.

The aqueous dispersions of polyacrylates or acrylate copolymers contained in the joint-sealing materials and coating materials as well as the pigments, plasticizers, wetting agents, defoamers, dispersion aids, preservatives and anti-aging agents which may be present are commercially available products known to the expert in the field of joint-sealing materials and coating materials for construction purposes.

The above-specified nonionic cellulose ethers to be used according to the invention are also commercially available products.

The invention is explained in more detail by means of preferred embodiments in the following.

BRIEF DESCRIPTION OF THE DRAWINGS

The materials described in the examples as well as additional materials produced for comparison purposes were subjected to a wash-out test in which a sprinkling apparatus as seen in FIG. 1 was used. The same apparatus is shown in side view in FIG. 2.

DETAILED DESCRIPTION OF THE DRAWINGS

Figure 1:
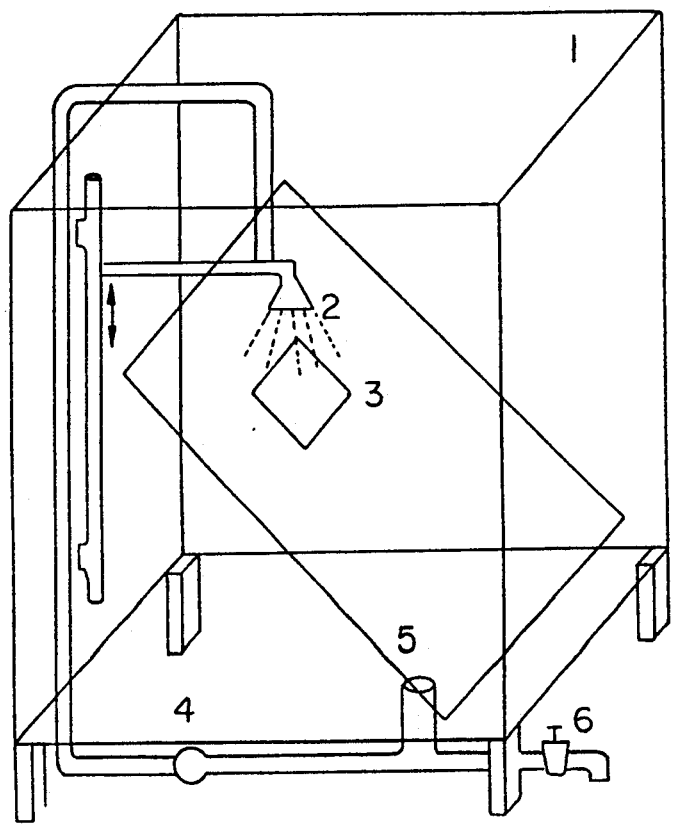
Figure 2:
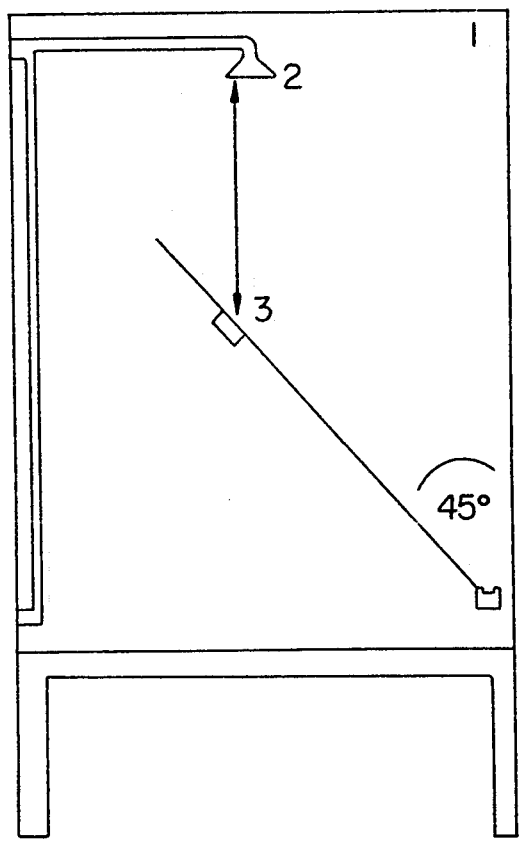

The sprinkling apparatus was composed of a housing of transparent plastic having the dimensions: height 70 cm, width 60 cm and depth 6.0 cm. It included a housing 1, a shower head 2, a sample dish 3, a pump 4, a floor drain 5 and a stopcock 6 for the drain. The sample dish 3 comprised a container having the dimensions 7×7 cm and was 2.5 cm deep. The shower head was a conventional hand shower head as used for personal hygiene and was adjusted for an even sprinkling of the sample. The distance between the sample dish 3 and the shower head 2 was 30 cm.

The apparatus was operated with de-mineralized water, and an excess pressure of about 0.4 bar was produced by the pump. The water throughput rate was 300 liter/hour. The spraying with water was carried out for 5 minutes, in each case 1 minute after the surface of the materials to be tested had been filled in the sample dish and brushed smooth. The wash-out (in percentage by weight) was determined by differential weighing before and after spraying.

The materials described in the examples were also evaluated with respect to their smoothing behavior. This test was carried out by 7 independent operators in the following manner. After the application of a 30 cm length of the material onto a smooth, even, dark base the material was smoothened using spatulas and fingers. The smoothing behavior was evaluated according to a scale of marks from 1 (=very good) to 6 (=insufficient).

EXAMPLE 1

The following constituents were mixed intensively for about 45 minutes in a planetary mixer:

| | |
|---|---|
| 1750 g | aqueous, commercially available polybutylacrylic ester dispersion (about 62% solids), having a pH value of 8.8–8.5, a glass transition temperature (Tg) of 50° C., a viscosity of about 250 mPa.s at 23° C. and an average particle size of 0.4 μm, |
| 250 g | chloroparaffin ($C_{12}$–$C_{14}$, 49% chlorine), |
| 2800 g | barium sulfate (commercial product: Barite EWO), |
| 100 g | titanium dioxide (commercial product KRONOS RN 56), |
| 25 g | sodium carbonate (industrial, pure commercial product), |
| 25 g | nonyl phenol-ethylene oxide adduct (about 9.5 EO), |
| 5 g | commercially available halogenized preservative, |
| 37 g | hydroxyethyl cellulose having a viscosity of about 4000 mPa.s (1% aqueous solution at 20° C., and a hydroxyethyl group content of 55% by weight, trade name: Natrosol 250 HHR). |

This mixture was decanted into 310 ml plastic cartridges and was storage stable for at least a year at temperatures up to 35° C.

| | |
|---|---|
| Workability test according to DIN 52456 (bore 4 mm, pressure 2 bar, test volumes 200 ml) | 2260 g/min |
| Smoothing behavior | good |
| Wash-out | 1% loss |

When 50 g of the afore-mentioned hydroxyethyl cellulose was added, the following results were obtained:

| | |
|---|---|
| Workability according to DIN 52456 | 1300 g/min |
| Smoothing behavior | very good |
| Wash-out | 0.3% loss |

EXAMPLE 2

The constituents listed in Example 1 were mixed intensively for about 45 minutes in a planetary mixer, but instead of the hydroxyethyl cellulose having a viscosity of 4000 mPa.s:

20 g of a hydroxypropyl cellulose having a viscosity of about 5000 mPa.s (2% aqueous solution at 20° C., and a hydroxypropyl group content of 70%, trade name Klucel M), was used.

This mixture was decanted into 310 ml plastic cartridges and was storage stable for at least a year at temperatures up to 35° C.

| | |
|---|---|
| Workability according to DIN 52456, determined as in Example 1 | 2100 g/min |
| Smoothing behavior | good |
| Wash-out | 5% loss |

EXAMPLE 3

The constituents listed in Example 1 were mixed intensively for about 45 minutes in a planetary mixer, but instead of the hydroxyethyl cellulose having a viscosity of 4000 mPa.s:

37 g of a methylhydroxypropyl cellulose having a viscosity of about 20,000 mPa.s (2% aqueous solution at 20° C., and a hydroxypropyl group content of 3.2% by weight, trade name: Culminal MHPC 20000 PR), was used.

This mixture was decanted into 310 ml plastic cartridges and was storage stable for at least a year at temperatures up to 35° C.

| | |
|---|---|
| Workability according to DIN 52456, determined as in Example 1 | 2870 g/min |
| Smoothing behavior | good |
| Wash-out | 3.5% loss |

EXAMPLE 4

The following constituents were mixed intensively for about 45 minutes in a planetary mixer.

| | |
|---|---|
| 4700 g | aqueous dispersion of a polyacrylic acid butyl ester with small quantities of monopolymerized acrylonitrile (60% solids content), pH value about 5 to 6, |
| 52 g | nonyl phenol-ethylene oxide adduct (about 9.5 EO), |

-continued

| | |
|---|---|
| 25 g | commercially available silicone cold-water defoamer mixture, |
| 13 g | commercially available phenolic preservative (Parmetol, Schuelke-Mayr, Hamburg), |
| 102 g | dispersed silicic acid (commercial product HDK V 15, Wacker-Chemie), |
| 36 g | ammonia solution (25%), |
| 52 g | chloroparaffin ($C_{10}$–$C_{14}$, 49% chlorine), |
| 18 g | of a hydroxyethylcellulose with a viscosity of about 4000 mPa.s (1% aqueous solution, and a hydroxyethyl group content of 55% by weight, trade name: Natrosol 250 HHR). |

This mixture was decanted into 310 ml plastic cartridges and was storage stable for at least one year at temperatures up to 35° C.

| | |
|---|---|
| Workability according to DIN 52456, determined as in Example 1 | 3700 g/min |
| Smoothing behavior | good |
| Wash-out | 4.5% loss |

EXAMPLE 5

The following constituents were mixed intensively for about 45 minutes in a planetary mixer:

| | |
|---|---|
| 2795 g | aqueous, commercially available dispersion of an acrylic acid ester-styrene-copolymer (about 50% solid material) with a pH value of about 8, a viscosity of 1200 mPa.s at 23° C. and an average particle size of about 0.1 μm (anionic dispersion type), |
| 180 g | chloroparaffin (($C_{10}$–$C_{12}$)-chain length, 40% chlorine), |
| 1600 g | barium sulfate (Barite C 11, Sachtleben), |
| 150 g | titanium dioxide (KRONOS RN 56), |
| 5 g | sodium salt of polyacrylic acid (Dispex N 40), |
| 100 g | formalin (30% formaldehyde solution), |
| 120 g | phthalic acid (bis-methylcyclohexanyl) ester, |
| 50 g | hydroxyethylcellulose having a viscosity of about 400 mPa.s (1% aqueous solution at 20° C., and a hydroxyethyl group content of 55% by weight, trade name Natrosol 250 HHR). |

This mixture was decanted into 310 ml plastic cartridges and was storage stable for at least a year at temperatures up to 35° C.

| | |
|---|---|
| Workability according to DIN 52456, determined as in Example 1 | 1500 g/min |
| Smoothing behavior | very good |
| Wash-out | 0.5% loss |

COMPARISON TESTS (a) Example 1 was repeated with the hydroxyethylcellulose omitted: 23% wash-out was obtained, (b) Example 1 was repeated and instead of the hydroxyethyl cellulose, carboxymethyl cellulose (DS 0.8, viscosity 400 mPa.s in 2% aqueous solution at 20° C.) was used: 27% wash-out was obtained, (c) Example 4 was carried out with the hydroxyethyl cellulose omitted: 20% wash-out was obtained.

We claim:

1. A joint-sealing or coating composition consisting essentially of:
   (a) an aqueous dispersion containing from about 40 to about 70% by weight of polyacrylate or acrylate copolymers; and
   (b) from about 0.4 to about 6% by weight of a nonionic cellulose ether selected from the group consisting of hydroxyethyl cellulose, hydroxyethyl-methyl cellulose, hydroxypropyl-methyl cellulose and hydroxypropyl cellulose having a Brookfield viscosity in a 2% aqueous solution at about 20° C. of at least about 3,000 mPa.s, based on the solids content of said dispersion.

2. A joint-sealing or coating composition as in claim 1 wherein said cellulose ether has a Brookfield viscosity of at least about 5,000 mPa.s.

3. A joint-sealing or coating composition as in claim 1 wherein said cellulose ether is present in an amount of from about 0.6 to about 5% by weight, based on the solids content of said dispersion.

4. A joint-sealing or coating composition as in claim 1 including from about 2 to about 60% by weight of an additive selected from a pigment, wetting agent, plasticizer, defoamer, dispersion agent and preservative, based on the weight of said composition.

5. A joint-sealing or coating composition as claim 4 wherein said plasticizer comprises a chlorinated hydrocarbon.

6. A joint-sealing or coating composition as in claim 4 wherein said wetting agent comprises a nonionic surfactant.

7. A process for the sealing of a joint or gap in a building structure, or for the coating of a surface exposed to rain or moisture comprising applying to said joint, gap or surface a composition consisting essentially of:
   (a) an aqueous dispersion containing from about 40 to about 70% by weight of polyacrylate or acrylate copolymer; and
   (b) from about 0.4 to about 6% by weight of a nonionic cellulose ether selected from the group consisting of hydroxyethyl cellulose, hydroxyethyl-methyl cellulose, hydroxypropyl-methyl cellulose and hydroxypropyl cellulose having a Brookfield viscosity in a 2% aqueous solution at about 20° C. of at least about 3,000 mPa.s, based on the solids content of said dispersion.

8. A process as in claim 7 wherein said cellulose ether has a Brookfield viscosity of at least about 5,000 mPa.s.

9. A process as in claim 7 wherein said cellulose ether is present in an amount of from about 0.6 to about 5% by weight, based on the solids content of said dispersion.

10. A process as in claim 7 wherein said composition contains from about 2 to about 60% by weight of an additive selected from a pigment, wetting agent, plasticizer, defoamer, dispersion agent and preservative, based on the weight of said composition.

11. A process as in claim 10 wherein said plasticizer comprises a chlorinated hydrocarbon.

12. A process as in claim 10 wherein said wetting agent comprises a nonionic surfactant.

13. A process for improving the workability, smoothing behavior and wash-out resistance of an unhardened surface of a joint-sealing or coating composition consisting essentially of an aqueous dispersion of from about 40 to about 70% by weight of polyacrylate or acrylate copolymer; consisting of adding to said composition from about 0.4 to about 6% by weight of a nonionic cellulose ether selected from the group consisting of hydroxyethyl cellulose, hydroxyethyl-methyl cellulose, hydroxypropyl-methyl cellulose and hydroxypropyl cellulose having a Brookfield viscosity in a 2% aqueous solution at about 20° C. of at least about 3,000 mPa.s, based on the solids content of said dispersion.

14. A process as in claim 13 wherein said cellulose ether has a Brookfield viscosity of at least about 5,000 mPa.s.

15. A process as in claim 13 wherein said cellulose ether is present in an amount of from about 0.6 to about 5% by weight, based on the solids content of said dispersion.

16. A process as in claim 13 wherein said composition contains from about 2 to about 60% by weight of an additive selected from a pigment, wetting agent, plasticizer, defoamer, dispersion agent and preservative, based on the weight of said composition.

17. A process as in claim 16 wherein said plasticizer comprises a chlorinated hydrocarbon.

18. A process as in claim 16 wherein said wetting agent comprises a nonionic surfactant.

* * * * *